Oct. 12, 1943.  C. F. RISSER  2,331,571
PRESSURE SIGNALING APPARATUS
Filed Nov. 14, 1941  3 Sheets-Sheet 1
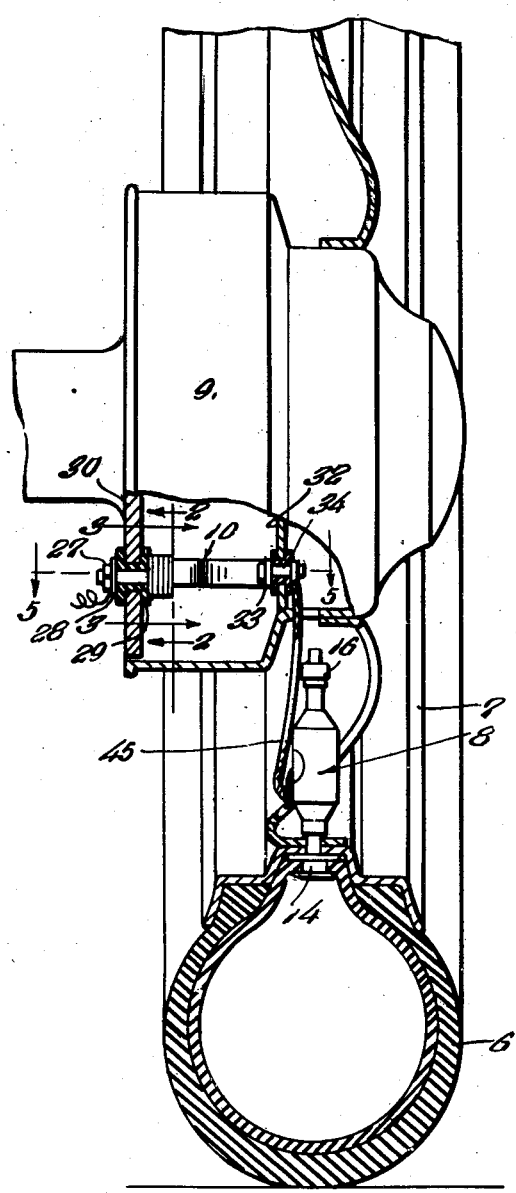
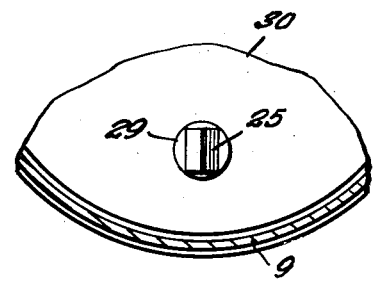
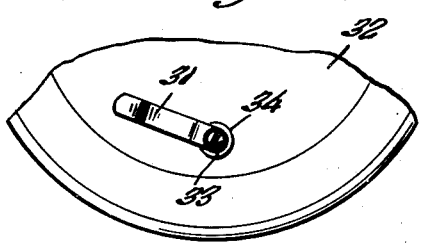
Inventor
Christian Francis Risser
By Clarence A. O'Brien
Attorney

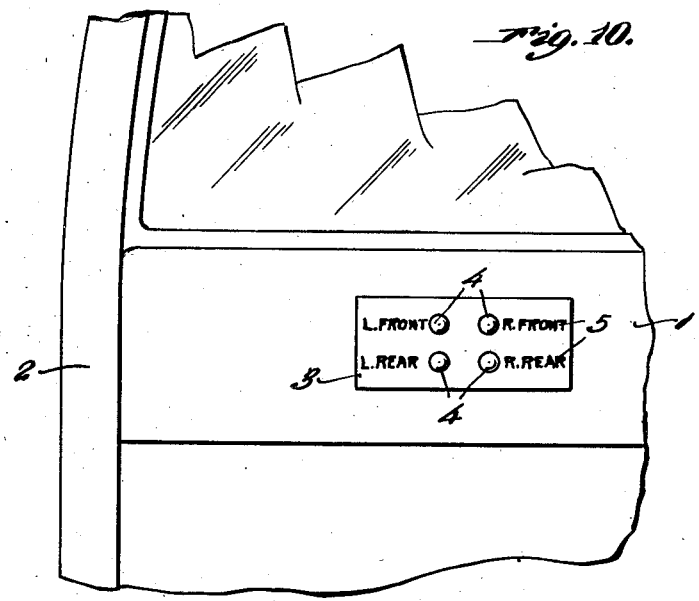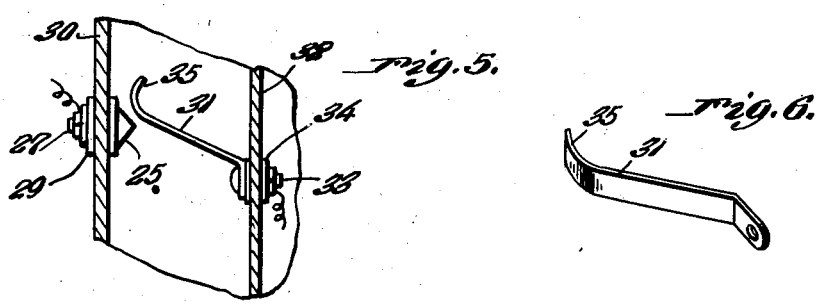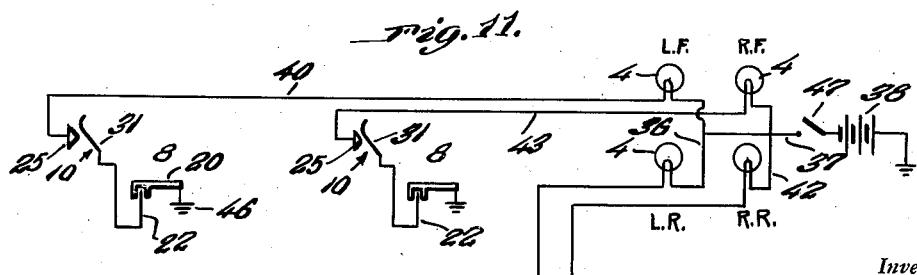

Oct. 12, 1943.   C. F. RISSER   2,331,571
PRESSURE SIGNALING APPARATUS
Filed Nov. 14, 1941   3 Sheets-Sheet 3
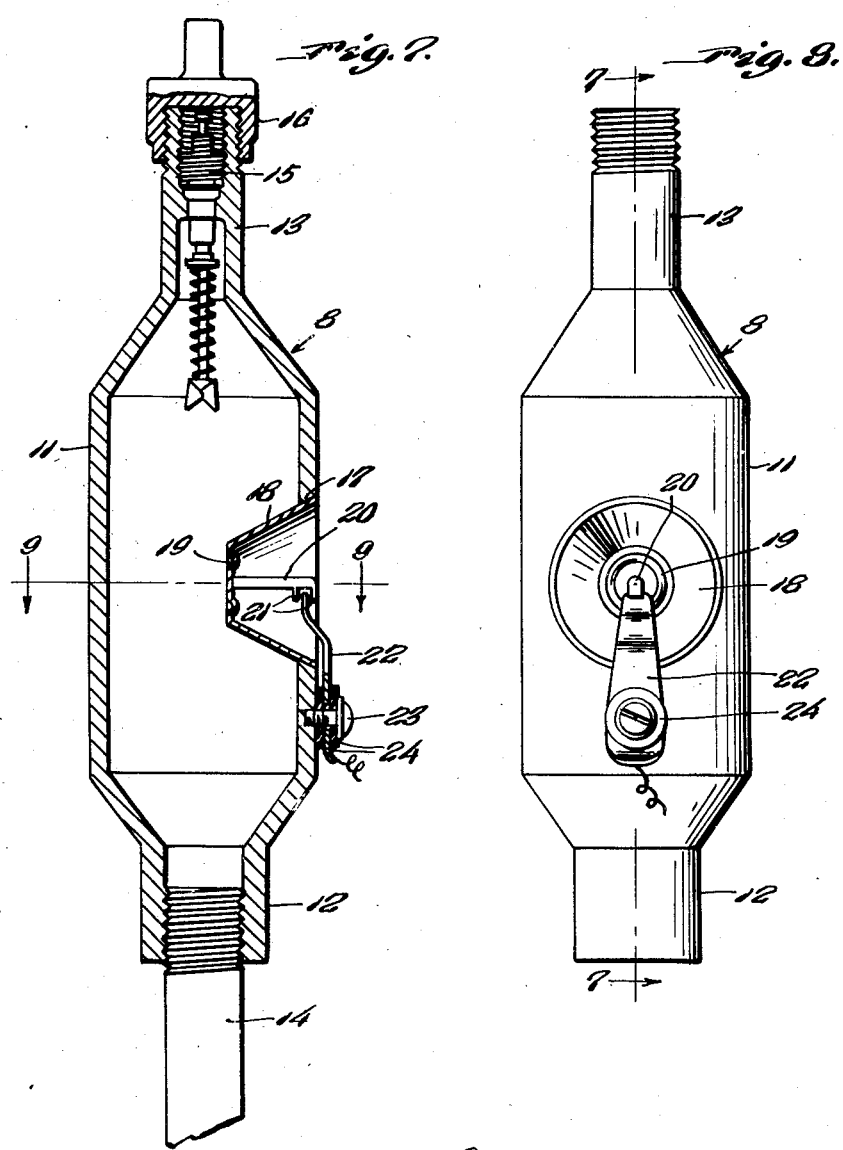
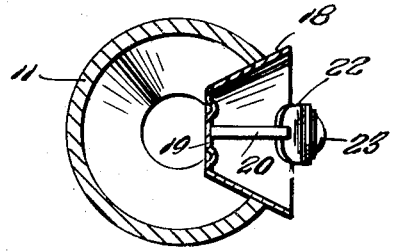
Inventor
Christian Francis Risser
By Clarence A. O'Brien
Attorney Patented Oct. 12, 1943

2,331,571

UNITED STATES PATENT OFFICE 2,331,571

PRESSURE SIGNALING APPARATUS

Christian Francis Risser, South Bend, Ind.

Application November 14, 1941, Serial No. 419,206

2 Claims. (Cl. 200—58)

My invention relates to improvements in pressure signaling apparatus for the pneumatic tires of automobiles, the primary object in view being to equip such vehicles, inexpensively and without material alteration of the same, with apparatus of simple construction for signaling to the operator either under or over inflation of any or all of the tires and which tire, or tires may be improperly inflated.

To the accomplishment of the above, and subordinate objects presently appear, a preferred embodiment of my invention has been illustrated in the accompanying drawings, set forth in detail in the succeeding description, and defined in the claims appended hereto.

In said drawings:

Figure 1 is a fragmentary view partly in vertical section and partly in elevation of one of the wheels of the automobile equipped according to my invention, Figure 2 is a detail view in section taken on the line 2—2 of Figure 1, Figure 3 is a similar view taken on the line 3—3 of Figure 1, Figure 4 is a view in perspective of the stationary contact of the flasher switch, Figure 5 is a view in horizontal section taken on the line 5—5 of Figure 1, Figure 6 is a view in perspective of the revolving contact of the flasher switch, Figure 7 is a view in longitudinal vertical section of the pressure operated circuit maker and breaker drawn to an enlarged scale and taken on the line 7—7 of Figure 8, Figure 8 is a view in side elevation of said pressure-operated circuit maker and breaker, Figure 9 is a view in transverse section taken on the line 9—9 of Figure 7, Figure 10 is a view in elevation of the instrument panel of the automobile, and the signal board, and Figure 11 is a diagrammatic view illustrating the electric circuits.

Referring to the drawings by numerals, according to my invention the instrument panel 1 of the automobile, represented at 2, has suitably fixed thereto a signal board 3 in which is mounted in any desired manner a plurality of electric signal lights 4 each of which is associated with the tire of one of the automobile wheels. Suitable legends, as at 5, provided on the signal board 3 identify the signal lights 4 with the tire of the left front, right front, left rear, and right rear wheels, respectively, of the automobile, so that when one or more of the signal lights 4 are energized the operator will be apprised of which tire, or tires, the signal or signals are concerned with.

The tire 6 of each wheel 7 is equipped with a pressure-operated circuit maker and breaker 8, and the brake housing 9 of each wheel 7 with a flasher switch 10, the pressure-operated circuit maker and breaker and the flasher switch of each wheel conjointly controlling the signal light 4 related to the tire of the wheel.

Each pressure-operated circuit maker and breaker 8 comprises an elongated barrel 11 of any suitable conductive metal terminating at its ends in reduced nipples 12, 13, the nipple 12 being threaded onto the valve stem 14 of the tire 6. The other nipple 13 has suitably threaded therein the usual valve insides of the valve stem 14 and designated 15 so that the tire 6 may be inflated through the barrel 11. The usual valve stem cap 16 is threaded onto the outer end of said nipple 13. Suitably secured in an opening 17 provided in the barrel 11 intermediate its ends and extending into said barrel is an inwardly tapering cup-like housing 18 of conductive metal, said housing projecting into the barrel 11 bottom innermost and said bottom having the form of a corrugated disk 19 flexible in opposite directions under variations of pressure in the barrel 11. Specifically, the disk 19 is designed to flex inwardly of the barrel 11 under fall of air pressure in the barrel 11 below the normal inflation pressure of the tire 6 and to be flexed outwardly of said barrel under rise of pressure in the barrel 11 above the normal inflation pressure for said tire. Under normal inflation in the tire, and hence in the barrel 11, the disk 19 is flexed into an intermediate position shown in Figure 7. The housing 18 contains a bar-like axially disposed contact 20 having an inner end suitably fixed in the center of the disk 19 and its outer end provided with a pair of laterally extending spaced-apart contact fingers 21. The contact fingers 21 straddle the free end of a leaf spring contact 22 having its outer end secured as by a screw 23 to the outer side of the barrel 11 and suitably insulated from said barrel by insulation washers 24. In the described intermediate position of the disk 19, the contact fingers 21 clear the leaf spring contact 22. However, under flexing of said disk 19 in either direction from said intermediate position, one or the other of the contact fingers 21 engages the leaf spring contact 22 to complete a circuit as will presently more clearly appear.

Each flasher switch 10 comprises a wedge-shaped contact 25 having a threaded shank 26 by means of which and a nut and washer 27, 28, respectively, said contact is fixed in a flanged insulation bushing 29 suitably secured in the usual stationary rear plate 30 of the brake housing 9. For intermittent coaction with the described fixed contact 25 of the flasher switch 10, a revolving brush in the form of a leaf spring 31 is fixed at one end to the front plate 32 of the brake housing 9 to extend toward the plate 30, the arrangement being such that the other end of said spring 31 wipingly engages the fixed contact 25 under rotation of the front plate 32 of said brake housing as will be clear. The fixed end of the leaf spring 31 is secured by a bolt 33 in an insulation bushing 34 suitably fixed in said plate 32. The free end of the leaf spring 31 is preferably curved as at 35 to facilitate wiping engagement with the contact 25 and preferably said leaf spring 31 inclines rearwardly as regards the direction of rotation of the wheel 7 forwardly to facilitate wiping of the end 35 over the contact 25.

Referring now more particularly to Figure 11, the signal lights 4 related to the left front and left rear tires are connected on one side, as by the wire 36, to a lead 37 extending from one side of the battery 38 of the ignition circuit, and on the other side to the shanks 26 of the contacts 25 of the flasher switches 8 related to the left front and left rear tires, through the medium of the leads 40, 41. The pair of signal lights 4 related to the right front and right rear tires are similarly connected on one side, as at 42 to the leaf 37, and on the other side similarly connected to the shanks of the contacts 25 of the flasher switches 10 related to the right front and right rear tires, through the medium of the leads 43, 44. In these connections, the shanks 26 and nuts 27 of the contacts 25 are utilized as binding posts. The leaf spring 31 of each flasher switch 10 is connected through the bolts 33 to the leaf spring contact 22 of the pressure-operated circuit maker and breaker 8 of the related wheel by means of a lead, as at 45, extending from said bolt 33 to said leaf spring contact 22. It should be explained, at this point, that each pressure-operated circuit maker and breaker 8 is grounded through the valve stem 14 to the wheel in any suitable manner, as represented at 46. A suitable cut-out switch is interposed in the lead 37.

Describing now the operation of my invention, in the event that the pressure in any tire should vary either above or below the normal inflation pressure, the diaphragm 19 of the pressure-operated circuit maker and breaker attached to the valve stem 14 of said tire will be operated in one direction or the other, for reasons which will be clear, to engage one or the other of the contact fingers 21 with the leaf spring contact 22 and thereby ground the circuit completed through the related flasher switch 10 so as to close the circuit to the related signal light 4 and advise the operator of variations in pressure in the related tire. As will be clear, the circuit thus closed flows through the appropriate signal light 4 from the battery 38 to the stationary contact 25 of the related flasher switch 10 and from said contact through the leaf spring 31 and lead 45 to the leaf spring contact 22 to be grounded in the manner already described and thus completed when the wheel revolves the leaf spring 31 into wiping engagement with the fixed contact 25.

The foregoing will, it is believed, suffice to impart a clear understanding of my invention without further explanation.

Manifestly the invention, as described, is susceptible of modification without departing from the inventive concept, and right is herein reserved to such modifications as fall within the scope of the subjoined claims.

What I claim is:

1. A circuit closer for attachment to the valve stem of an automobile tire to close a signaling circuit under variations in air pressure in the tire comprising an elongated barrel adapted to be attached at one end thereof to said stem and forming a pressure chamber, a cup-like housing fitted in one side of said barrel to extend into said chamber open side outermost and having a bottom within said chamber adapted to flex in opposite directions under pressure variations in the chamber, and a pair of contacts extending from said bottom and from said side of the barrel, respectively, and one movable relative to the other by flexing of said bottom into and from engagement with the other.

2. A circuit closer for attachment to the valve stem of an automobile tire to close a signaling circuit under variations in air pressure in the tire comprising an elongated barrel adapted to be attached at one end thereof to said stem and forming a pressure chamber, a cup-like housing fitted in one side of said barrel to extend into said chamber open side outermost and having a bottom within said chamber adapted to flex in opposite directions under pressure variations in the chamber, and a pair of contacts extending from said bottom and from said side of the barrel, respectively, and one movable relative to the other by flexing of said bottom into and from engagement with the other, one of said contacts having a forked end straddling the other for engagement with said other contact under flexing of said bottom in opposite directions.

CHRISTIAN FRANCIS RISSER.